US005530637A

United States Patent [19]
Fujita et al.

[11] Patent Number: 5,530,637
[45] Date of Patent: Jun. 25, 1996

[54] ELECTRIC POWER RECEIVING CIRCUIT AND RESPONDER FOR AUTOMATIC VEHICLE IDENTIFICATION SYSTEM INCLUDING THE SAME

[75] Inventors: Suguru Fujita; Makoto Hasegawa, both of Tokyo; Haruyoshi Endo, Zama, all of Japan

[73] Assignee: Matsushita Electric Industrial Co., Ltd., Osaka, Japan

[21] Appl. No.: 207,621

[22] Filed: Mar. 9, 1994

[30]    Foreign Application Priority Data

Mar. 11, 1993  [JP]  Japan ................................ 5-050457
Mar. 25, 1993  [JP]  Japan ................................ 5-066327
Dec. 22, 1993  [JP]  Japan ................................ 5-325067

[51] Int. Cl.$^6$ .............................. H02M 7/06; H04B 1/26
[52] U.S. Cl. ............................ 363/126; 455/300
[58] Field of Search ............................ 363/126, 52, 53, 363/84; 455/330, 269, 287; 343/754, 700 MS File

[56]                References Cited

U.S. PATENT DOCUMENTS 4,777,490  10/1988  Sharma et al. ........................ 343/754
4,918,749   4/1990  Entschladen et al. ................. 455/327
5,394,159   2/1995  Schneider et al. ............... 343/700 MS
5,428,363   6/1995  D'Hont ................................. 343/742

FOREIGN PATENT DOCUMENTS 63-54023  3/1988  Japan .
3-7034    1/1991  Japan .

*Primary Examiner*—Peter S. Wong
*Assistant Examiner*—Adolf Berhane
*Attorney, Agent, or Firm*—Rossi & Associates

[57]              ABSTRACT

A first responder for transmitting an identification signal in response to a microwave interrogation signal comprises an electric power receiving circuit for receiving the interrogation signal to produce a dc power, having a microstrip line antenna having a trapezoid shape whose upside has a width from ½ to ¼ of a wavelength, and a rectifying circuit. The rectifying circuit may be modified. A second responder comprises an electric power receiving circuit having a microstrip line antenna from the received microwave signal, a power supplying circuit for supplying a dc power in the vertical and horizontal positions of the responder against a polarizing plane of the microwave signal, an identification signal generation circuit for transmitting an identification signal through the antenna with given polarization plane by detecting the responder attitude. A third responder receives a microwave signal circularly polarized or polarized in vertical and horizontal directions and transmits the identification signal in either of vertical or horizontal directions according to the received microwave intensity in both directions.

44 Claims, 10 Drawing Sheets

ELECTRIC POWER RECEIVING CIRCUIT AND RESPONDER FOR AUTOMATIC VEHICLE IDENTIFICATION SYSTEM INCLUDING THE SAME

BACKGROUND OF THE INVENTION

1. Field of the Invention

This invention relates to an electric power receiving circuit and a responder, including the same, for an automatic vehicle identification system including an interrogator for identifying the responder existing in the service area of the interrogator through transmitting a radio signal.

2. Description of the Prior Art

Responders for an automatic vehicle (mobile unit) identification system including an interrogator for identifying the responder existing in the service area of the interrogator through using radio signals are known. The responder which may be held by a man or mounded on a mobile unit such as an automatic vehicle, existing in or enter the service area of the interrogator returns a radio signal (microwave) from the interrogator with modulation with a data stored therein to identify the responder.

FIG. 18 is a plan view, a partially schematic, of a prior art electric power receiving circuit having a microstrip line antenna included in a prior art responder (not shown). This prior art electric power receiving circuit including a microstrip line antenna comprises a radiation patch 7 having a half wavelength formed on a substrate 9, microstrip lines 5a to 5c formed on the substrate 9, a diode 8a for sending a modulated signal to the microstrip line 5a, and diodes 8b to 8c for rectifying a received radio signals. This strip line antenna features that no special power source such as a battery is required. However, there is a problem that the size of the radiation patch has a half wave length of the interrogation signal, so that the dimension of the responder becomes large.

Moreover, there is a problem that the energy of the microwave transmitted from the interrogator cannot be received by the prior art responder if an attitude of the responder does not agree with a polarizing plane of the microwave.

SUMMARY OF THE INVENTION

The present invention has been developed in order to remove the above-described drawbacks inherent to the conventional electric power receiving circuit and responder for automatic vehicle identification system including the same.

According to the present invention there is provided a first electric power receiving circuit for receiving electric power of a radio signal comprising: an antenna for receiving the electric power, the antenna having a microstrip line formed in a quadrangle shape having first and second sides confronting each other, the first side having a first length corresponding to a half of a wavelength of the radio signal, the second side having a second length larger than a quarter of the wavelength of the radio signal and smaller than a half of the wavelength; and a power supplying circuit for supplying a dc power from the received electric power. The microstrip line may be formed in a trapezoid having a height smaller than the half of the wavelength and larger than the quarter of the wavelength. It is favourable that the second length is ⅜ of wavelength of the radio signal.

According to the present invention there is also provided a second electric power receiving circuit having first and second antennas, having the same structure as used in the first electric power receiving circuit, arranged in a line spaced with a giving interval. The power supplying circuits in the first and second electric power receiving circuits may be modified to obtain a double voltage output or full-wave rectified output.

According to the present invention there is further provided a third electric power receiving circuit for receiving an electric power of a radio signal comprising: an antenna for receiving the electric power, the antenna having a microstrip line including first and second portions, the first portion being formed in a quadrangle shape having first and second sides confronting each other, the first side having a first length corresponding to a half of a wavelength of the radio signal, the second side having a second length being larger than a quarter of the wavelength of the radio signal and smaller than a half of the wavelength, the second portion defined by an arch and a chord of the arc, the chord being defined by the first side; and a power supplying circuit for supplying a dc power from the received electric power.

According to the present invention there is provided a first responder for transmitting an identification signal in response to a radio signal transmitted from an interrogator comprising: an electric power receiving circuit which is selected from the first, second, and third electric power receiving circuits mentioned above, for receiving an electric power of the radio signal to produce a dc supply power for transmitting the identification signal.

According to the present invention there is also provided a second responder for transmitting an identification signal in response to a radio signal polarized in a predetermined direction transmitted from an interrogator comprising: an antenna for receiving the electric power of the radio signal, the antenna having a microstrip line extending in first and second directions perpendicular each other, the antenna having first and second peripheral portions in the first and second directions respectively and first and second feeding points at the first and second peripheral portions to supply first and second dc supply powers generated in responder to the received electric power respectively; an altitude detection unit for detecting an altitude of the antenna to determine which first and second directions agrees with the predetermined direction; a power supplying circuit for supplying, in accordance with the detected altitude, the first dc supply power from the first feeding point when the predetermined direction is parallel to the first direction and a second dc supply power from the second feeding point when the predetermined direction is parallel to the second direction; an identification signal generation and transmitting circuit responsive to the first and second dc supply powers for generating and supplying the identification signal through the second feeding point when the predetermined direction is parallel to the first direction and through the first feeding point when the predetermined direction is parallel to the second direction, the antenna transmitting the identification signal in response to the supplied identification signal. The microstrip line may have a quadrangle shape or a circle shape.

According to the present invention there is further provided a third responder for transmitting an identification signal in response to a radio signal polarized in a predetermined direction transmitted from an interrogator comprising: an antenna for receiving the electric power of the radio signal, the antenna having a microstrip line formed in a quadrangle shape having a first pair of sides confronting each other and a second pair of sides confronting each other; an altitude detection unit for detecting an altitude of the antenna to determine which pair of the first and second pair of sides is substantially perpendicular to the predetermined direction; a power supplying circuit for supplying, in accordance with the detected altitude, a dc supply power from the antenna around one of the first and second pair of the sides which is substantially perpendicular to the direction at the present condition of the altitude; and an identification signal generation and transmitting circuit responsive to the dc supply power for generating and supplying the identification signal to the antenna around the other of the first and second pair of the side, the antenna transmitting the identification signal toward the interrogator. The power supplying circuits in the first to third responder may be modified to obtain a double voltage output or full-wave rectified output.

According to the present invention there is further provided a fourth responder as described in the third responder, wherein the power supplying circuit comprises a first diode having a first pair of terminals and a second diode having a second pair of terminals, one of the first pair of terminals being connected to the antenna around an intermediate portion of the first side, one of the second pair of terminals being connected to the antenna around an intermediate portion of the third side.

According to the present invention there is further provided a fifth responder as described in the fourth responder wherein the power supplying circuit further comprises a third diode having a third pair of terminals and a fourth diode having a fourth pair of terminals to provide a double voltage rectification of the dc voltage, one of the first pair of terminals being connected to the antenna around an intermediate of the first side, one of the fourth pair of terminals being connected to the antenna around the intermediate portion of the third side, the other of the first and second pair of terminals being grounded, the first and second diodes having the same rectifying directions opposite to the third and fourth diodes with respect to the antenna.

According to the present invention there is further provided a sixth responder as described in the fifth responder, wherein the first and second diodes have a first voltage-current characteristic and the third and fourth diodes have a second voltage-current characteristic different from the first voltage-current characteristic.

According to the present invention there is provided a seventh responder for transmitting an identification signal in response to a radio signal polarized in a predetermined direction transmitted from an interrogator comprising: an antenna for receiving electric power of the radio signal, the antenna having a microstrip line formed in a quadrangle shape having first and second sides confronting each other and third and fourth sides confronting each other; a power supplying circuit for supplying a dc supply power from the antenna around the first and third side; an identification signal generation circuit responsive to the dc supply power for generating the identification signal; and a coupling circuit for supplying the identification signal to the antenna around the second and fourth sides, the antenna transmitting the identification signal toward the interrogator. The antennas of this responder may have circle shapes.

According to the present invention there is also provided an eighth responder for transmitting an identification signal in response to a radio signal polarized in a predetermined direction transmitted from an interrogator comprising: first and second antennas arranged in a line, each receiving electric power of the radio signal, the antenna having a microstrip line formed in a quadrangle shape; an altitude detection unit for detecting altitude of the first and second antennas; a first power supplying circuit for supplying a first dc supply power from the received electric power developed in accordance with the detected altitude when the line is perpendicular to the predetermined direction; a second power supplying circuit for supplying a second dc supply power from the received electric power developed in accordance with the detected altitude when the line is parallel to the predetermined direction; an identification signal generation and transmitting circuit for generating and supplying the identification signal to the second antenna which transmits the identification signal polarized in a direction parallel to the line when the line is perpendicular to the predetermined direction in response to the first dc supply power and to the first antenna which transmits the identification signal polarized in perpendicular to the line when the line is parallel to the line in response to the first dc supply power. The antennas of the eighth responder may have circle shapes. The microstrip line of this antenna may have a trapezoid shape.

According to the present invention there is further provided a ninth responder for transmitting an identification signal in response to an interrogation signal transmitted from an interrogator with vertical and horizontal polarization, comprising: an antenna for receiving the electric power of the radio signal, the antenna having a microstrip line extending in first and second directions perpendicular each other to generate first and second dc supply powers in response to the received electric power, the antenna having first and second peripheral portions in the first and second directions respectively and first and second feeding points at the first and second peripheral portions to supply the first and second dc supply power respectively; a comparator for comparing the first with second dc supply power in intensity; a power supplying circuit for supplying either of the first or second dc supply powers from the first or second feeding points in accordance with the result of the comparing means; and an identification signal generation and transmitting circuit responsive to the first and second dc supply powers for generating and supplying the identification signal through the second feeding point when an intensity of the first dc supply power is larger than an intensity of the second dc supply power and through the first feeding point when the intensity of the first dc supply power is not larger than the intensity of the second dc supply power.

According to the present invention there is provided a tenth responder for transmitting an identification signal in response to an interrogation signal transmitted from an interrogator with circular polarization, comprising: an antenna for receiving the electric power of the radio signal, the antenna having a microstrip line extending in first and second directions perpendicular each other to generate first and second dc supply powers along the first and second directions in response to the received electric power, the antenna having first and second peripheral portions in the first and second directions respectively and first and second feeding points at the first and second peripheral portions to supply the first and second dc supply power respectively; a comparator for comparing the first dc supply power with the second dc supply power in intensity; a power supplying circuit for supplying either of the first or second dc supply powers from the first or second feeding points in accordance with the result of the comparing means; and an identification signal generation and transmitting circuit responsive to the first and second dc supply powers for generating and supplying the identification signal through the second feeding point when an intensity of the first dc supply power is larger than an intensity of the second dc supply power and through the first feeding point when the intensity of the first dc supply power is not larger than the intensity of the second dc supply power.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
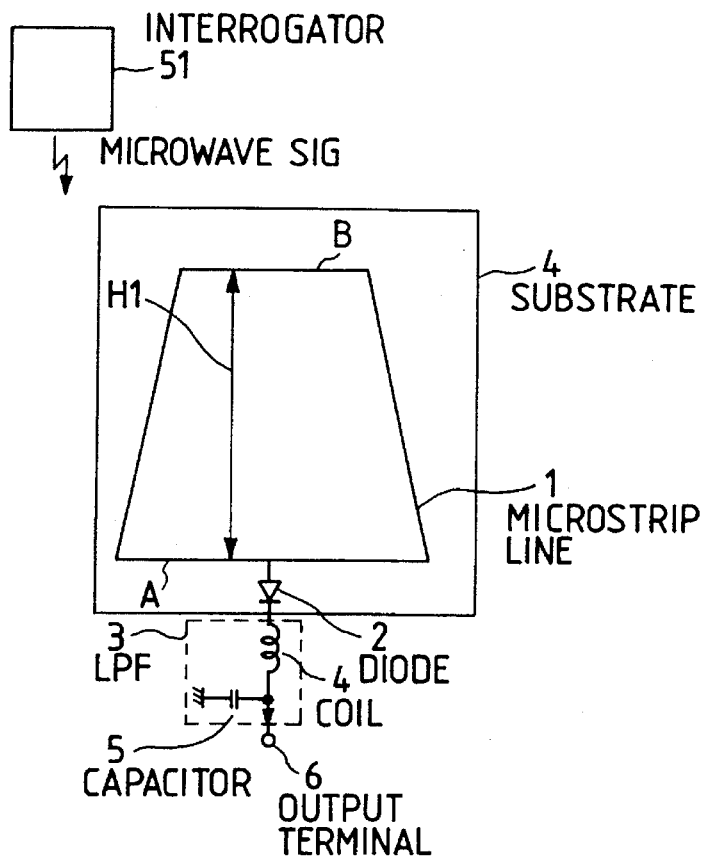
FIG. 1 is a plan view, partially schematic, of the first embodiment for showing an electric power receiving circuit, having a microstrip line antenna, included in a responder of this invention.

FIG. 1 is a plan view, partially schematic, of the first embodiment for showing an electric power receiving circuit, having a microstrip line antenna, included in a responder of this invention. A microstrip line 1 having a trapezoid shape is formed on a substrate 4. That is, the microstrip line 1 is formed on a dielectric film (not shown) supported by a ground plane (not shown). A base A of the trapezoid shape of the microstrip line 1 has a half of a wavelength of a microwave to be received, that is, an interrogation signal. A length value of the upside B of the trapezoid is selected from a half to a quarter of the wavelength of the microwave. An anode of a diode 2 is connected to an intermediate portion of the base A of the trapezoid. A cathode of is connected to a lowpass filter circuit 3. The lowpass filter 3 comprises a coil 4 and a capacitor 5 wherein one end of the coil 4 is connected to the cathode of the diode 2, the other end of the coil 4 is connected to an output terminal 6 and to one end of the capacitor 5, and the other end of the capacitor 5 is grounded.

The microstrip line 1 receives an energy from the microwave signal transmitted toward the electric power receiving circuit from the interrogator 51 and supplies an electric power generated from the received energy to the diode 2 as an alternating voltage. The diode 2 allows a current to flow therethrough with a half wave rectification. The rectified current is supplied to the lowpass filter 3 which smooths the rectified current to produced a dc output current or voltage.

A value of the length of the upside of the microstrip line 1 is selected from a half to quarter of the wavelength of the microwave signal in accordance with an impedance matching condition between the microstrip line 1 and the diode 2. This structure provides that a length of the microstrip line 1, i.e., a height H1 of the trapezoid, is smaller by 10% than a half of wavelength of the microwave signal. That is, the microstrip line 1 formed in the trapezoid having a height smaller than a half of the wavelength of the microwave signal and larger than the quarter of the wavelength.

More specifically, the value of upside B is favorable from five sixteenths to seven sixteenths of the wavelength of the microwave signal. Further, if the value of the upside B is about three eights of the wavelength of the microwave signal, the height H1 is most reduced by 10% of a half of the wavelength of the microwave signal. The reduction of the height H1 is caused as follows:

The oblique lines of the trapezoid contribute the resonating of the antenna 1, so that lengths of the oblique lines can be considered as resonant length. Therefore, the height H1 is smaller than that would be provided in the case of a square shape microstrip line antenna.

Figure 2:
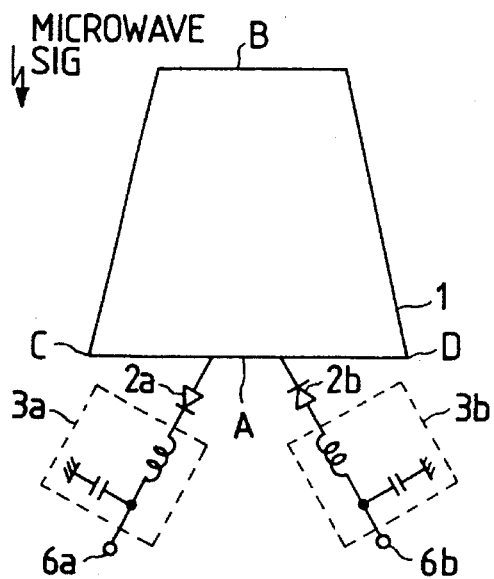
FIG. 2 is a plan view, partially schematic, of a second embodiment for showing an electric power receiving circuit having a microstrip line antenna included in a responder of this invention.

FIG. 2 is a plan view, partially schematic, of a second embodiment for showing an electric power receiving circuit having a microstrip line antenna included in a responder of this invention. The basic structure of this embodiment is similar to the first embodiment. Different points are in that two diodes are provided to increase an output voltage and the direction of the diode differ from each other. That is, the microstrip line 1 having a trapezoid shape is formed on a substrate. A base A of the trapezoid shape of the microstrip line 1 has a half of a wavelength of a microwave to be received. A length value of the upside B of the trapezoid is selected from a half to quarter of the wavelength of the microwave. An anode of a diode 2a is connected to a portion of the base A of the trapezoid, which is intermediate between the center of the base and one corner C on the base A. A cathode of the diode 2a is connected to a lowpass filter circuit 3a which has the same circuit structure as the lowpass filter circuit 3.

On the other hand, a cathode of a diode 2b is connected to the antenna i around the portion of the base A of the trapezoid. An anode of the diode 2b is connected to a lowpass filter circuit 3b which has the same circuit structure as the lowpass filter circuit 3 of the first embodiment.

The microstrip line 1 of the second embodiment receives an energy from the microwave transmitted toward the electric power receiving circuit from an interrogator (not shown) and supplies an electric power generated from the received energy to the diodes 2a and 2b as an alternating voltage. The diode 2a allows a current to flow therethrough with a half wave rectification from the microstrip line 1 to the lowpass filter 3a. The rectified current is supplied to the lowpass filter 3a which smooths the rectified current to produce a first dc output current or voltage in a direction from the microstrip line 1 to the output terminal 6a. On the other hand, the diode 2b allows a current to flow therethrough with a half wave rectification from the lowpass filter 3b to the microstrip line 1. The rectified current is supplied to the lowpass filter 3b which smooths the rectified current to produced a second dc output current or voltage in a direction from the output terminal 6b to the microstrip line 1. Therefore, a voltage double rectifying connection is provided, so that a double voltage is obtained between the output terminals 6a and 6b.

Similar to the first embodiment, a value of the length of the upside of the microstrip line 1 is selected from a half to quarter of the wavelength of the microwave signal in accordance with an impedance matching condition between the microstrip line 1 and the diode 2. This structure provides that a height of the trapezoid is smaller by 10% than a wavelength of a halfwave of the microwave.

Figure 3:
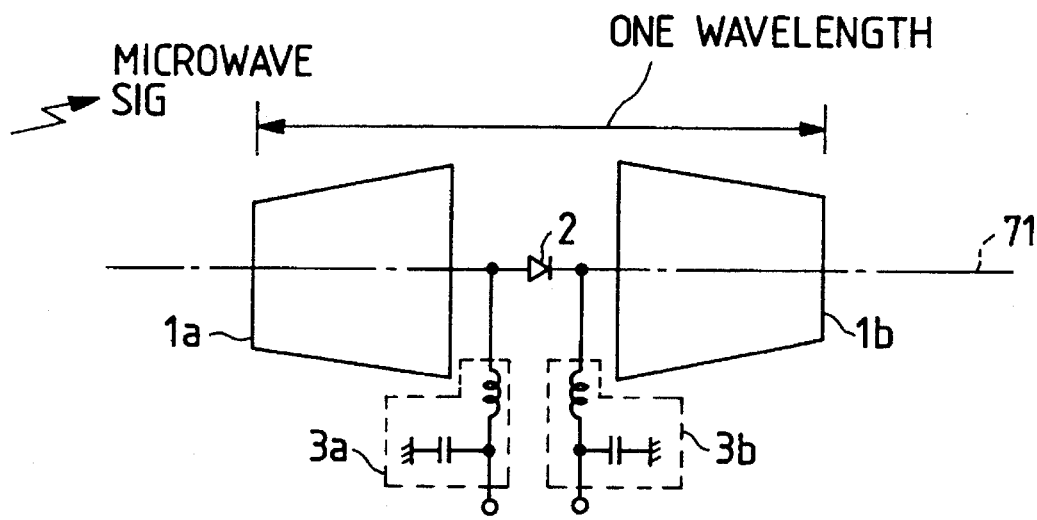
FIG. 3 is a plan view, partially schematic, of a third embodiment for showing an electric power receiving circuit, having microstrip line antennas, included in a responder of this invention.

FIG. 3 is a plan view, partially schematic, of a third embodiment for showing an electric power receiving circuit, having microstrip line antennas, included in a responder of this invention.

The microstrip lines 1a and 1b, each having the same trapezoid shape as the microstrip line shown in FIG. 1 are formed on a substrate and arranged in a line 71 with their bases confronting each other spaced such that upside of respective trapezoid shape have a predetermined interval, for example, one wavelength of the microwave signal. A center portion of the base of the trapezoid shape of the microstrip line 1a is connected to an anode of a diode 2 and an input of the lowpass filter 3a which has the same circuit structure as the lowpass filter circuit 3 of the first embodiment. A cathode of the diode 2 is connected to to the microstrip line 1b around a center portion of the base of the trapezoid shape of the microstrip line 1b and to an input of the lowpass filter 3b which has the same circuit structure as the lowpass filter circuit 3 of the first embodiment.

The electric power receiving circuit of the third embodiment receive an energy from the microwave transmitted toward this circuit from an interrogator (not shown) and supplies a dc electric power generated from the received energy through the diode 2 and the lowpass filters 3a and 3b which provide a half wave voltage double rectifier connection.

Similar to the first embodiment, the height of the trapezoid of each microstrip lines 1a and 1b is smaller by 10% than a wavelength of a halfwave of the microwave.

Figure 4:
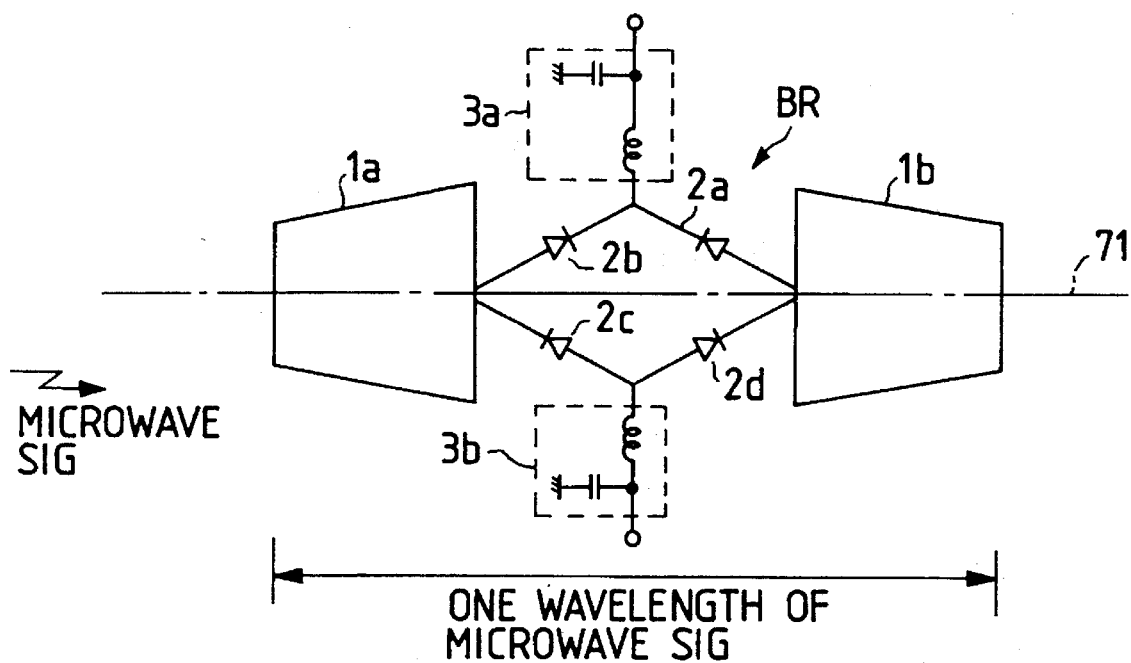
FIG. 4 is a plan view, partially schematic, of a fourth embodiment for showing an electric power receiving circuit, having microstrip line antennas, included in a responder of this invention.

FIG. 4 is a plan view, partially schematic, of a fourth embodiment for showing an electric power receiving circuit, having microstrip line antennas, included in a responder of this invention.

The microstrip lines 1a and 1b, each having the same trapezoid shape as the microstrip line 1 shown in FIG. 1 are formed on a substrate and arranged in a line 71 with their bases confronting each other spaced such that upside of respective trapezoid shape have a predetermined interval, for example, one wavelength of the microwave signal. The microstrip lines 1a and 1b are connected to a bridge rectifier BR to obtain a higher voltage and a higher power. That is, the center portion of the base of the trapezoid shape of the microstrip line 1a is connected to an anode of a diode 2b and a cathode of a diode 2c, i.e., one input of the bridge rectifier BR. The center portion of the base of the trapezoid shape of the microstrip line 1b is connected to a cathode of a diode 2d and an anode of a diode 2a, i.e., the other input of the bridge rectifier BR. The input of the lowpass filter 3a which has the same circuit structure as the lowpass filter circuit 3 is connected to cathodes of the diode 2b and the diode 2a, i.e., one output of the bridge rectifier BR. The input of the lowpass filter 3b which has the same circuit structure as the lowpass filter circuit 3 is connected to anodes of the diode 2c and the diode 2d, i.e., the other output of the bridge rectifier BR.

The electric power receiving circuit of the fourth embodiment receives electric energy from the microwave signal transmitted toward this circuit from an interrogator (not shown) and supplies a dc electric power generated from the received energy through the diodes 2a to 2d and the lowpass filters 3a and 3b, so that a full wave voltage double rectified output is provided.

Similar to the first embodiment, the height of the trapezoid of each microstrip lines 1a and 1b is smaller by 10% than a wavelength of a halfwave of the microwave.

Figure 5:
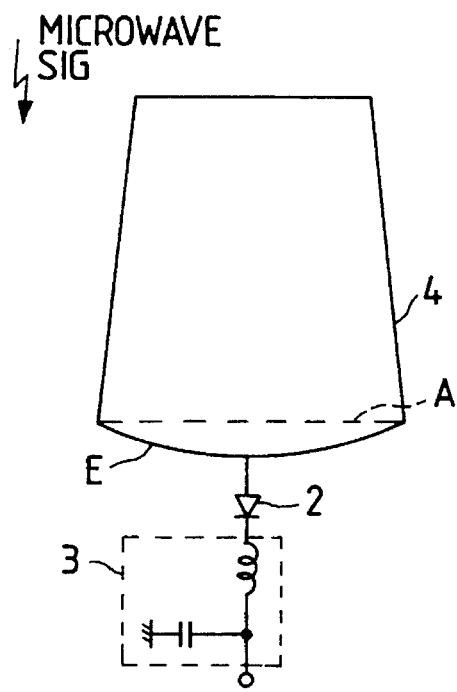
FIG. 5 is a plan view, partially schematic, of a fifth embodiment for showing an electric power receiving circuit, having a microstrip line antenna, included in a responder of this invention.
Figure 18:
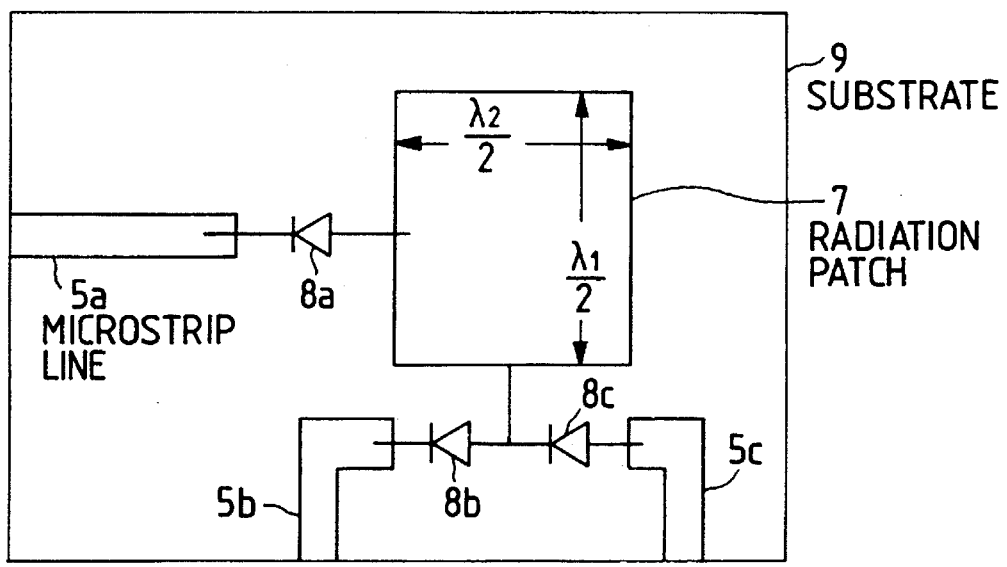
FIG. 18 is a plan view, a partially schematic, of a prior art electric power receiving circuit having a microstrip line antenna included in a prior art responder.

FIG. 5 is a plan view, partially schematic, of a fifth embodiment for showing an electric power receiving circuit, having a microstrip line antenna, included in a responder of this invention. The basic structure of this embodiment is similar to the first embodiment. Different point is in that a microstrip line 4 for receiving electric energy transmitted is formed such that the base of the trapezoid of the microstrip line 1 of the first embodiment is replace by a circular arc E to increase a degree of matching between a wave length of the transmitted wave from an interrogator and the microstrip line 4. More specifically, the antenna of this embodiment has first and second microstrip lines, the first microstrip line being formed in a trapezoid having a base A, the second strip line defined by an arch and a chord of said arc, the chord being defined by the base A.

An anode of a diode 2 is connected to a center portion of the circular arc E. A cathode of the diode 2 is connected to a lowpass filter circuit 3.

The microstrip line 1 of the fifth embodiment receives electric energy from the microwave signal transmitted toward the electric power receiving circuit from an interrogator (not shown) and supplies an electric power generated from the received energy to the diode 2 as an alternating voltage. The diode 2 allows a current to flow therethrough with a half wave rectification from the microstrip line 4 to the lowpass filter 3. The rectified current is supplied to the lowpass filter 3 which smooths the rectified current to produced a dc output current or voltage.

Similar to the first embodiment, a value of the length of the upside of the microstrip line 1 is selected from a half to quarter of the wavelength of the microwave in accordance with an impedance matching condition between the microstrip line 1 and the diode 2. This structure provides that a height of the trapezoid is smaller by 10% than a wavelength of a halfwave of the microwave.

As mentioned above, in the first to fifth embodiments, the upside of the microstrip line is selected to have a substantial trapezoid shape in order to miniaturize the microstrip line and improve the impedance matching to the diode.

Further, in the second to fourth embodiments, the modified rectifying circuits provide a double voltage output or a full wave rectified voltage.

Figure 6:
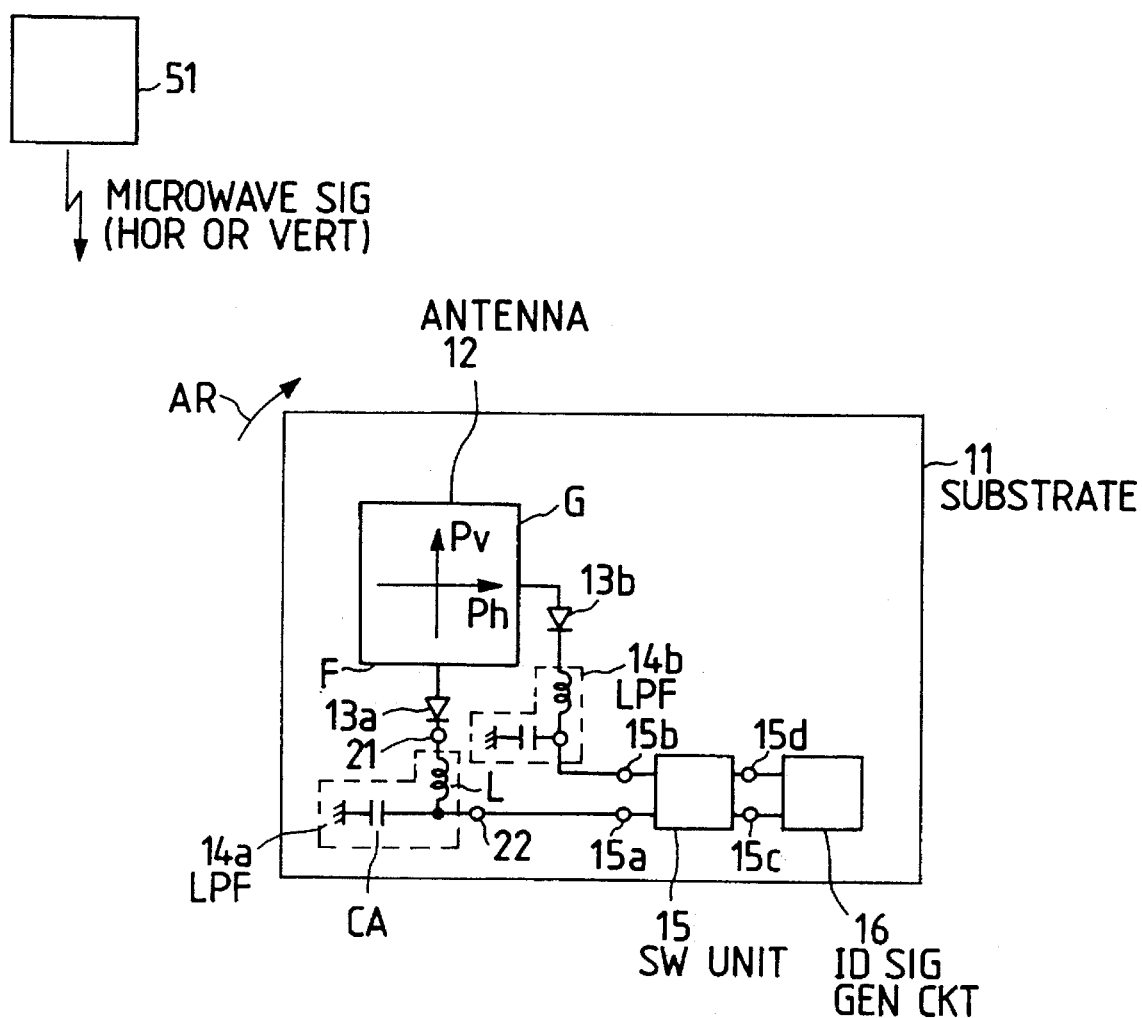
FIG. 6 is a plan view, partially schematic, of a sixth embodiment for showing a responder including a microstrip line patch antenna of this invention.

FIG. 6 is a plan view, partially schematic, of a sixth embodiment for showing a responder including a microstrip line patch antenna of this invention.

The responder of the sixth embodiment comprises a microstrip line patch antenna (antenna) 12 for receiving a linearly polarized microwaves transmitted from an interrogator 51, the antenna 12 having a square shape of which bases are about a half of the wavelength of microwave signal (interrogation signal) to be received, a first diode 13a having an anode connected to the an intermediate portion of a side F of the square shape of the antenna 12 and a cathode connected to a lowpass filter 14a for rectifying the received microwave signal from the interrogator, a second diode 13b having an anode connected to the an intermediate portion of a side G of the square shape of the antenna 12 and a cathode connected to a lowpass filter 14b for rectifying the received microwave signal from the interrogator, an identification signal generation circuit 16 for generating an identification signal, and a switch unit 15 having terminals 15a to 15c for switching a connection condition between lowpass filters 14a and 14b and the identification signal generation circuit 16. Each of low pass filters 14a and 14b comprises a coil L and a capacitor CA. A first terminal 21 of the lowpass filter 14a or 14b is connected to one end of the coil L. The other end is connected to a second terminal 22 and one end of the capacitor CA. The other end of the capacitor CA is grounded. The first terminal 21 is connected to the cathode of the diode 3a or 3b. The second terminal 22 is connected to the terminal 15a or 15b of the switch unit 15.

Figure 7:
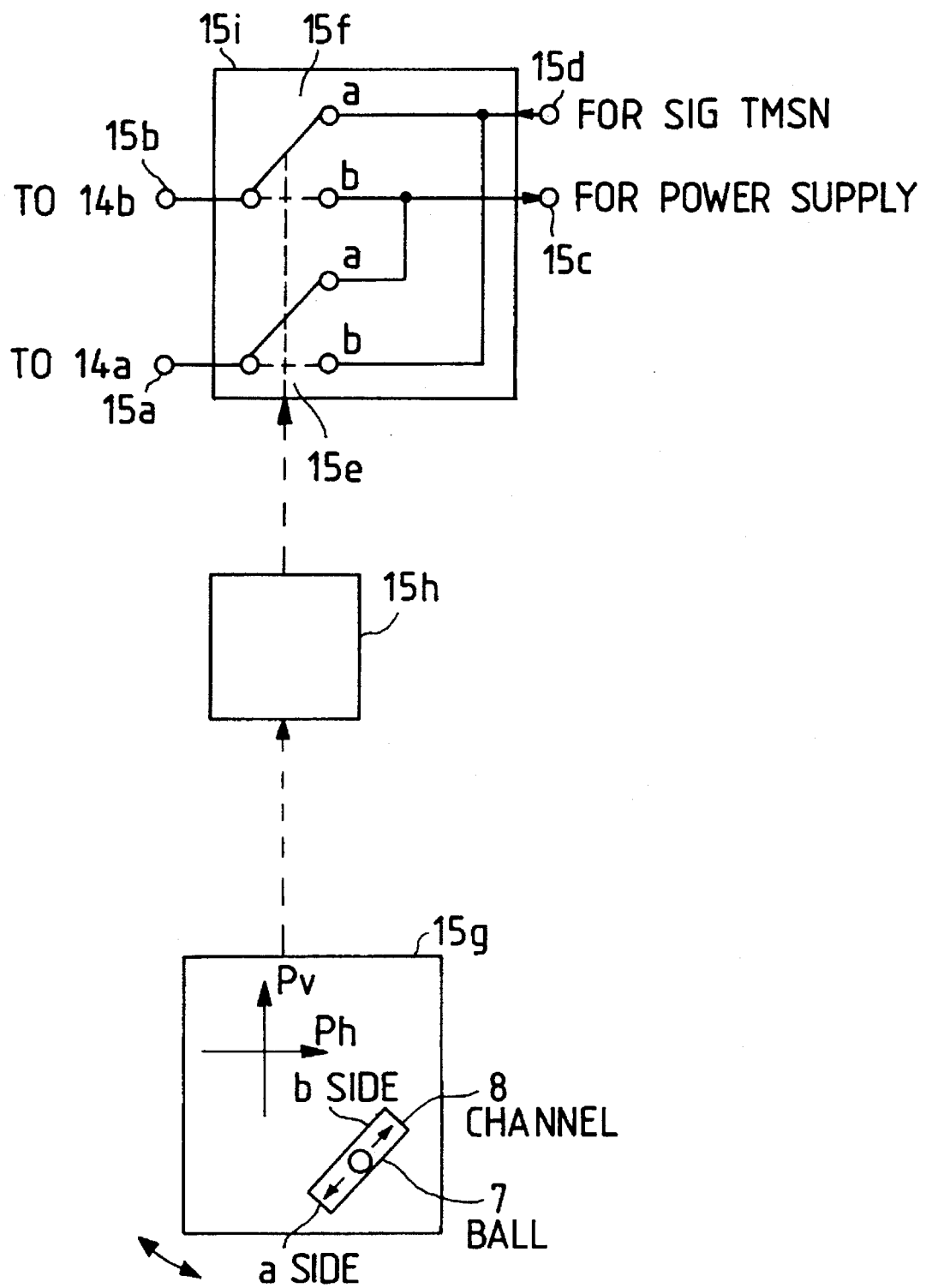
FIG. 7 is a schematic circuit diagram of the switch unit 15 used in the embodiments of this invention.

FIG. 7 is a schematic circuit diagram of the switch unit 15 used in the embodiments of this invention. The switch unit 15 comprises a switch circuit 15i, an altitude detection portion 15g, and an actuator 15h. The switch circuit 15i having four terminals 15a to 15d and two switches 15e and 15f. These switches are switched between "a" side position and "b" side position. When these switches are in "a" side position, the terminal 15a is connected to the terminal 15c and the terminal 15b is connected to the terminal 15d. When these switches are in "b" side position, the terminal 15a is connected to the terminal 15d and the terminal 15b is connected to the terminal 15c. The terminal 15c is connected to a power input terminal of the identification signal generation circuit 16 for receiving a dc supply power. The terminal 15d is connected to an output of the identification signal generation circuit 16 for receiving the identification signal.

The altitude detection portion for detecting an altitude of the antenna 12 comprises a channel 8 and a ball arranged in the channel 8 such that the ball 7 moves in the channel 8 in accordance with the altitude of the channel 8, that is, the antenna 12 or the responder. The actuator 15h actuates the switches 15e and 15f between "a" and "b" side positions in accordance with the detected altitude.

Operation will be described.

An interrogator 51 transmits a linearly polarized microwave signal, that is, vertically or horizontally polarized microwave signal, toward the responder. If the responder enters or exists in a service area of the interrogator, the antenna receives the microwave signal. A receiving polarizing plane against the antenna 12 changes between Pv and Ph in accordance with the altitude of the responder, i.e., rotation of the responder by 90 degrees as shown by the arrow AR. When the polarizing plane of the microwave is vertical (Pv) against the antenna 12, an electric power is generated in response to reception of the microwave signal and supplied to the lowpass filter 14a through the diode 13a. In this altitude condition, the switches 15e and 15f are switched to "a" side position in response to the altitude detection portion 15g via the actuator 15h. Thus, the electric power generated in response to reception of the microwave signal is supplied to the identification signal generation circuit 16 via the lowpass filter 14a and the switch unit 15 as a dc supply power. The identification signal generation circuit 16 generates and supplies the identification signal in response to the dc supply power to the diode 13b through the switch unit 15 and the lowpass filter 14b. In this altitude condition, the identification signal supplied to the terminal 15d of the switch unit 15 is outputted from the terminal 15b and supplied to the diode 13b through the lowpass filter 14b. Then, the identification signal is transmitted with a horizontal polarization (Ph) which is different from the transmitted microwave signal from the interrogator. The identification signal has a lower frequency than the microwave signal of the interrogation signal, so that the identification signal is supplied to the antenna 12 through the lowpass filter 14b. When the altitude of the responder changes by 90 degrees, i.e., the polarizing plane at the antenna 12 is turned horizontal (Ph), the switches 15e and 15f are switched to "b" side position in response to the altitude detection portion 15g. Thus, the electric power generated in response to reception of the microwave signal is supplied to the identification signal generation circuit 16 via the diode 13b, the lowpass filter 14b, and the switch unit 15. In response to this, the identification signal generation circuit 16 generates and supplies the identification signal to the diode 13a through the switch unit 15 and the lowpass filter 14a. Then, the identification signal is transmitted with a vertical polarization (Pv) which is different from the microwave signal from the interrogator by 90 degrees.

As mentioned above, according to the responder of this embodiment provides a dc supply power for the generation of the identification signal irrespective of the altitude of the responder, i.e., horizontal or vertical position of the responder against the polarizing plane of the transmitted microwave signal and transmitting the identification signal by the same antenna with a linearly polarizing plane different from that of the microwave signal from the interrogator. In other words, the identification signal is transmitted with a predetermined polarizing plane with respect to the ground irrespective of the attitude of the responder.

Figure 8:
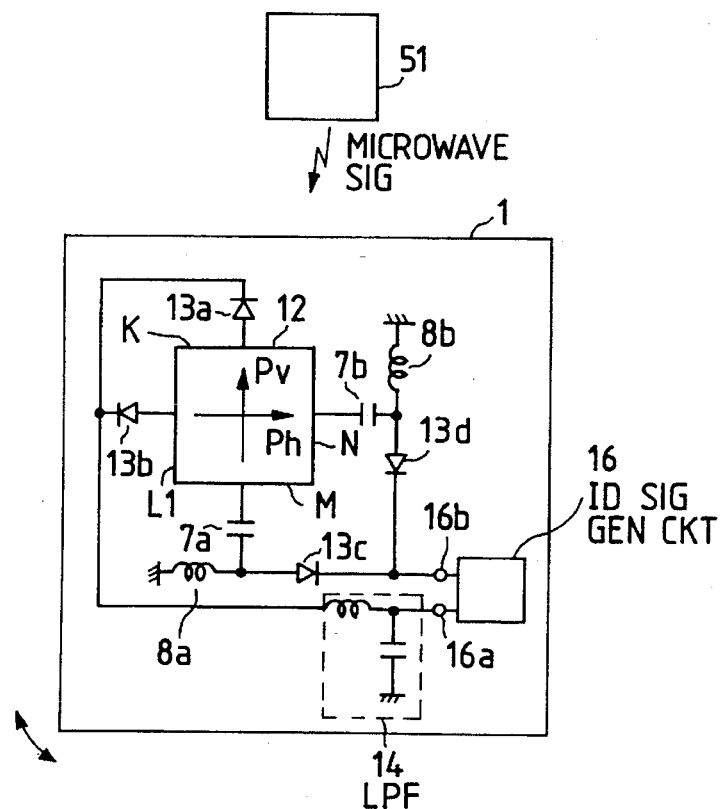
FIG. 8 is a plan view, partially schematic, of a seventh embodiment for showing a responder, having a microstrip line patch antenna included in a responder of this invention.

FIG. 8 is a plan view, partially schematic, of a seventh embodiment for showing a responder, having a microstrip line patch antenna included in a responder of this invention.

Difference of this embodiment from the first embodiment is in that the switch unit 15 is omitted by providing two more diode. That is, the responder of the seventh embodiment comprises the microstrip line patch antenna (antenna) 12 for receiving the linearly polarized microwaves transmitted from the interrogator 51, the antenna 12 having the square shape of which sides have about a half of the wavelength of microwave signal of the interrogation signal, the first diode 13a having an anode connected to the an intermediate portion (feeding point) of a side K of the square shape of the antenna 12 and a cathode connected to the lowpass filter 14 for rectifying the received microwave signal from the interrogator, the second diode 13b having an anode connected to the an intermediate portion (feeding point) of a side L1 of the square shape of the antenna 12 and a cathode connected to the lowpass filter 14 together with the cathode of the diode 13a for rectifying the received microwave signal from the interrogator, the lowpass filter 14, an identification signal generation circuit 16 having a first terminal 16a for receiving the rectified electric power and generating the identification signal and a second terminal 16b for outputting the identification signal, a first coupling circuit having a third diode 13c, and a second coupling circuit having a fourth diode 13d. The second terminal 16b of the identification signal generation circuit 16 is connected to cathodes of the third and fourth diodes 13c and 13d. The first coupling circuit for supplying the identification signal to the antenna 12 comprises the third diode 13c, a capacitor 7a and a coil 8a. The third diode supplies the identification signal through the capacitor 7a to the intermediate portion (feeding point) of a side M of the antenna 12. The coil 8a is provided for dc feedbacking of which one end is connected to a junction point of the capacitor 7a for dc cutting and the third diode 13c. The second coupling circuit for supplying the identification signal to the antenna 12 has the same structure of the first coupling circuit and the capacitor 7b is connected to the intermediate portion (feeding point) of a side N of the antenna 12.

Operation will be described.

The interrogator 51 transmits a linearly polarized microwave signal toward the responder. If the responder enters or exist in a service area of the interrogator, the antenna receives the microwave signal. A receiving polarizing plane against the antenna 12 changes between Pv and Ph in accordance with the altitude of the responder. When the polarizing plane is vertical (Pv), an electric power is generated in response to reception of the microwave signal in the vertical direction Pv and supplied from the intermediate portion of the side K through the first diode 13a to the lowpass filter 14. Thus, the electric power generated in response to reception of the microwave signal is supplied to the identification signal generation circuit 16 via the lowpass filter 14 as a dc supply power. The identification signal generation circuit 16 generates and supplies the identification signal in response to the dc supply power to the antenna 12 through the fourth diode 13d and the capacitor. Then, the identification signal is transmitted with a horizontal polarization (Ph) which is different from the transmitted microwave signal from the interrogator. When the altitude of the responder changes by 90 degrees, i.e., the polarizing plane of the received microwave signal at the antenna 12 is turned horizontal (Ph), the electric power generated in response to reception of the microwave signal in the horizontal direction is supplied to the identification signal generation circuit 16 via the diode 13b and the lowpass filter 14b. In response to this, the identification signal generation circuit 16 generates and supplies the identification signal to the antenna through the diode 13c and the capacitor 7a. Then, the identification signal is transmitted with a vertical polarization (Pv) which is different from the microwave signal from the interrogator by 90 degrees. In fact, the identification signal is supplied to the antenna through both coupling circuits and transmitted in the vertical and horizontal directions at the same time. However, because the interrogator has a structure such that it can receive the identification signal polarized in either of horizontal or vertical direction. The lowpass filter 14 has the same structure of the lowpass filter 14a or 14b.

As mentioned above, according to the responder of this embodiment provides a dc supply power for the generation of the identification signal irrespective of the altitude of the responder, i.e., horizontal or vertical position of the responder against the polarizing plane of the transmitted microwave signal and transmitting the identification signal by the same antenna with a linearly polarizing plane different from the microwave signal from the interrogator without the switch unit 15 mentioned in the sixth embodiment.

Figure 9:
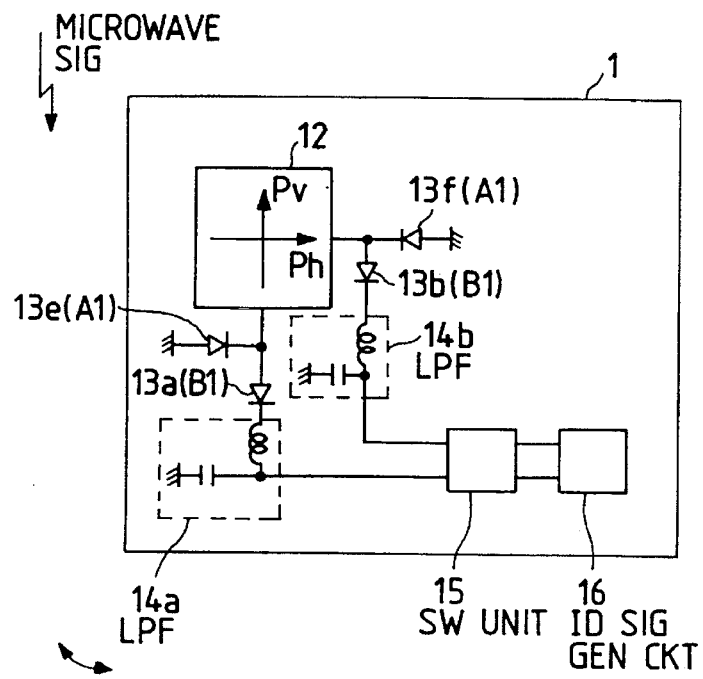
FIG. 9 is a plan view, partially schematic, of an eighth embodiment for showing a responder including a microstrip line antenna of this invention.

FIG. 9 is a plan view, partially schematic, of an eighth embodiment for showing a responder including a microstrip line antenna of this invention. Difference of this embodiment from the sixth embodiment is in that diodes 13e and 13f are added. That is, a cathode of the diode 13e is connected to a junction point of the diode 13a and the antenna 12 and an anode of the diode 13e is grounded. On the other hand, a cathode of the diode 13f is connected to a junction point of the diode 13b and the antenna 12 and an anode of the diode 13f is also grounded. Therefore, the generated electric power from the received microwave signal is rectified as a double voltage output. Therefore, the double voltage dc supply power is supplied to the identification signal generation circuit 16 from either of the lowpass filter 14a or 14b in accordance with the attitude of the responder. The identification signal is transmitted by the antenna 12 in the similar manner to the sixth embodiment.

Figure 10:
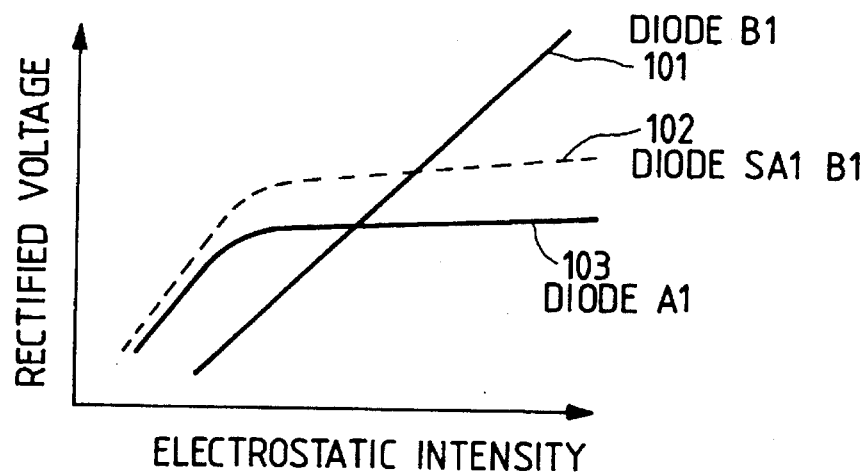
FIG. 10 shows a measurement result of rectified voltage to electrostatic intensity characteristic of diodes used in the ninth embodiment.

The responder of a ninth embodiment has the substantially the same structure as the eighth embodiment. Therefore, the circuit structure is shown in FIG. 9 also. FIG. 10 shows a measurement result of rectified voltage to electrostatic intensity characteristic of the received microwave signal used in the ninth embodiment. Difference of this embodiment from the seventh embodiment is in that two types of diodes having different forward voltage to current characteristics are used. That is, the diodes 13e and 13f have a forward voltage-current characteristic A1 as shown by curve 103. This characteristic depends on the forward voltage to current characteristic of the diodes. On the other hand, the diodes 13a and 13b have a forward voltage to current characteristic B1 as shown by curve 101. The combination of diodes having different forward voltage to current characteristic provides adjustment in the dependency of the electrostatic intensity of the received microwave signal. That is, the combination of the A1 and B1 types of the diodes provides an intermediate forward voltage to current characteristic as shown in the curve 102. In fact, the diode 13e and 13f having the forward voltage to current characteristic A1 employ diodes HSU276 manufactured by HIHACHI and the diode 13a and 13b having the forward voltage to current characteristic B1 employ diodes MA707 manufactured by NEC for example.

Figure 11:
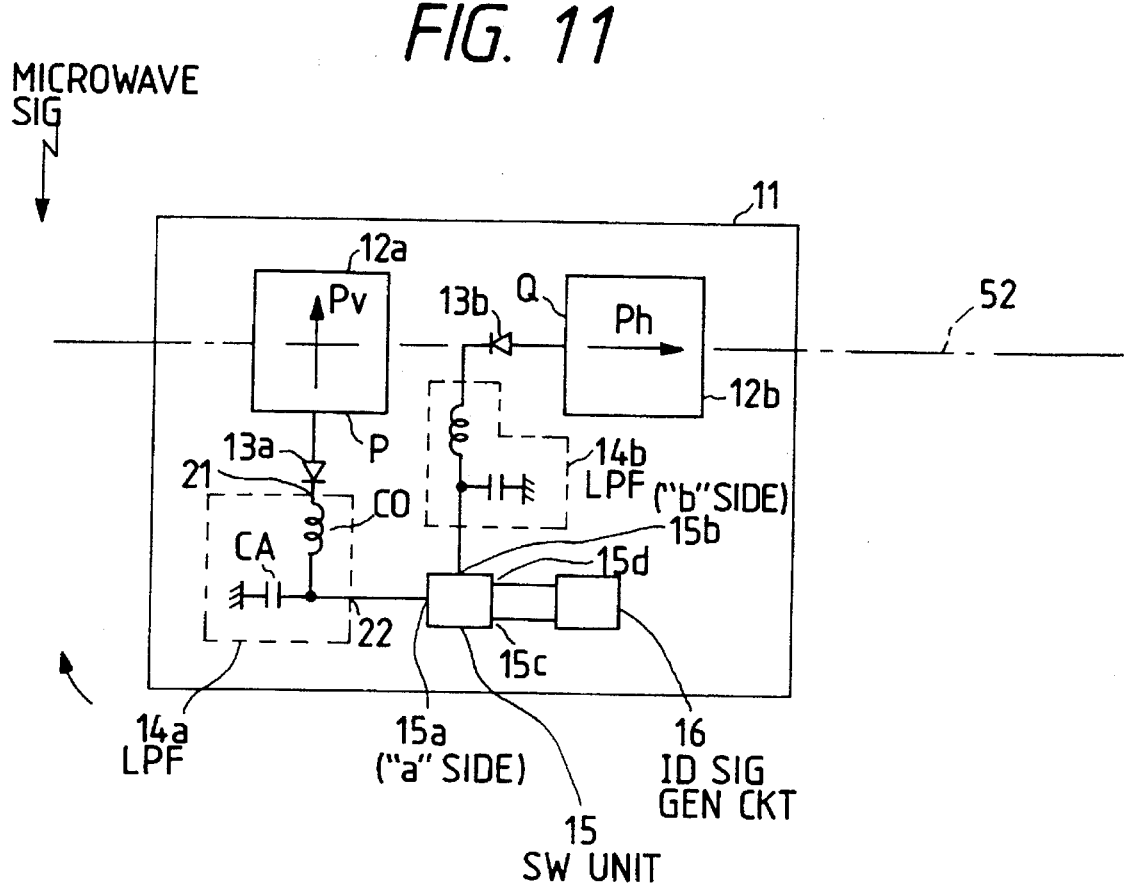
FIG. 11 is a plan view, partially schematic, of a tenth embodiment for showing a responder including a microstrip line antenna of this invention.

FIG. 11 is a plan view, partially schematic, of a tenth embodiment for showing a responder including microstrip line antennas of this invention.

The responder of the tenth embodiment comprises a microstrip line patch antenna (antenna) 12a for receiving a vertically linearly polarized microwaves transmitted from an interrogator (not shown), the antenna 12a having a square shape of which bases are about a half of the wavelength of microwaves to be received, a first diode 13a having an anode connected to an intermediate portion of a side P of the square shape of the antenna 12a and a cathode connected to the lowpass filter 14a for rectifying the received microwave signal from the interrogator, a microstrip line patch antenna (antenna) 12b for receiving a vertically linearly polarized microwaves transmitted from the interrogator (not shown), the antenna 12b having a square shape of which sides are about a half of the wavelength of microwaves to be received the second diode 13b having an anode connected to the a center portion of a side Q of the square shape of the antenna 12b and a cathode connected to a lowpass filter 14b for rectifying the received microwave signal from the interrogator, the antennas 12a and 12b being arranged in a line 52, an identification signal generation circuit 16 for generating an identification signal, and a switch unit 15 having terminals 15a to 15c for switching a connection condition between lowpass filters 14a and 14b and the identification signal generation circuit 16. Each of low pass filters 14a and 14b comprises a coil CO and a capacitor CA. A first terminal 21 of the lowpass filter 14a or 14b is connected to one end of the coil CO. The other end is connected to a second terminal 22 and one end of the capacitor CA. The other end of the capacitor CA is grounded. The first terminal 21 is connected to the cathode of the diode 13a or 13b. The second terminal 22 is connected to the terminal 15a or 15b of the switch unit 15. The switch unit 15 and the identification signal generation circuit 16 have the same structure and operation as the sixth embodiment. Thus, the detailed description is omitted.

Operation will be described.

An interrogator (not shown) transmits a linearly polarized microwave signal toward the responder. If the responder enters or exist in a service area of the interrogator, the antenna receives the microwave signal. A receiving polarizing plane against the antennas 12a and 12b changes between Pv and Ph in accordance with the altitude of the responder. When the polarizing plane is vertical (Pv), an electric power is generated at the antenna 12a in response to reception of the microwave signal and supplied to the lowpass filter 14a through the diode 13a. In this altitude condition, the switches 15e and 15f are switched to "a" side position in response to the altitude detection portion 15g via the actuator 15h. Thus, the electric power generated in response to reception of the microwave signal is supplied to the identification signal generation circuit 16 via the lowpass filter 14a and the switch unit 15 as a dc supply power. The identification signal generation circuit 16 generates and supplies the identification signal in response to the dc supply power to the diode 13b to the switch unit 15. In this altitude condition, the identification signal supplied to the terminal 15d of the switch unit 15 is outputted from the terminal 15b and supplied to the diode 13b. Then, the identification signal is transmitted by the antenna 12b with a horizontal polarization (Ph) which is different from the transmitted microwave signal from the interrogator. When the altitude of the responder changes by 90 degrees, i.e., the polarizing plane at the antennas 12a or 12b is turned horizontal (Ph), the switches 15e and 15f are switched to "b" side position in response to the altitude detection portion 15g. Thus, the electric power generated in response to reception of the microwave signal is supplied to the identification signal generation circuit 16 via the diode 13b, the lowpass filter 14b, and the switch unit 15. In response to this, the identification signal generation circuit 16 generates and supplies the identification signal to the diode 13a through the switch unit 15 and the lowpass filter 14a. Then, the identification signal is transmitted by the antenna 12a with a vertical polarization (Pv) which is different from the microwave signal from the interrogator by 90 degrees.

In the responders of the sixth to ninth embodiments, two feeding points are provided at one antenna. In this case, a change in impedance of a circuit, such as the diode 13a causes another change in impedance of the diode 13b. This decrease degrees of matching between the antenna and the circuit connected to the feeding points. That is, received electric power is not fully supplied to the identification signal generation circuit 16 and the it is difficult to supply the identification signal to the antenna fully. However, in this embodiment, each of feeding points is provided to each of antennas 12a and 12b, so that each of feeding points does not effect the other. In other words, the isolation between the feeding points or between the circuits connected to the antennas 12a and 12b is provided.

As mentioned above, according to the responder of this embodiment provides a dc supply power for the generation of the identification signal irrespective of the altitude of the responder, i.e., horizontal or vertical position of the responder against the polarizing plane of the transmitted microwave signal and transmitting the identification signal by the same antenna with a linearly polarizing plane different from the microwave signal from the interrogator. Moreover, there are provided two antennas 12a and 12b, so that it is not necessary to consider the isolation between feeding points, i.e., the intermediate portions of side P and Q.

Figure 12:
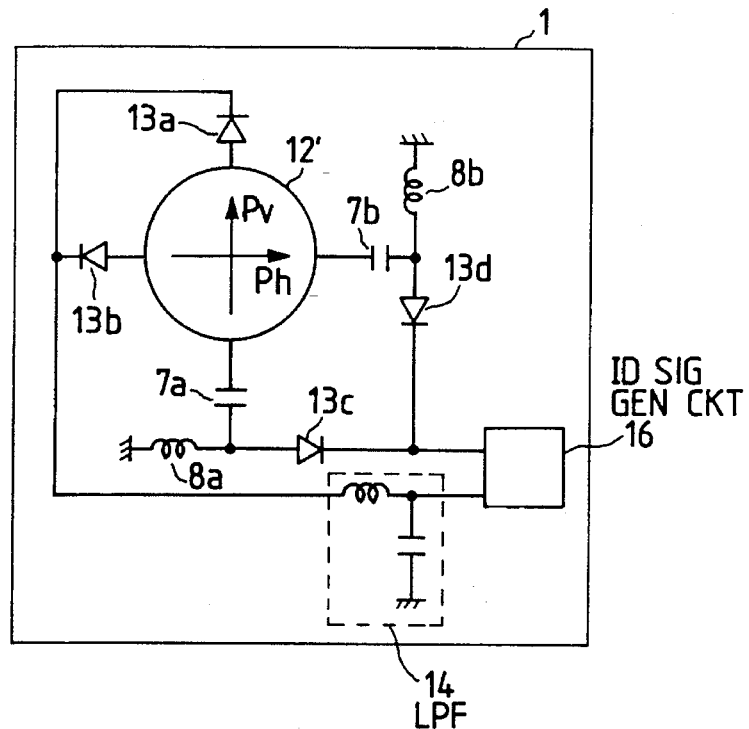
FIG. 12 is a plan view, partially schematic, of a eleventh embodiment for showing a responder including a microstrip line antenna of this invention.

FIG. 12 is a plan view, partially schematic, of a eleventh embodiment for showing a responder including a microstrip line antenna of this invention. This embodiment is a modification of the seventh embodiment shown in FIG. 8. That is, difference of this embodiment from the seventh embodiment is in that the microstrip line patch antenna 12' has a circular shape. Other structure and operation are the same as the seventh embodiment. In both seventh and eleventh embodiments, the microstrip antennas extend in the first and second directions (Pv and Ph) and the feeding points are provided at peripheral portions in the first and second directions.

Figure 13:
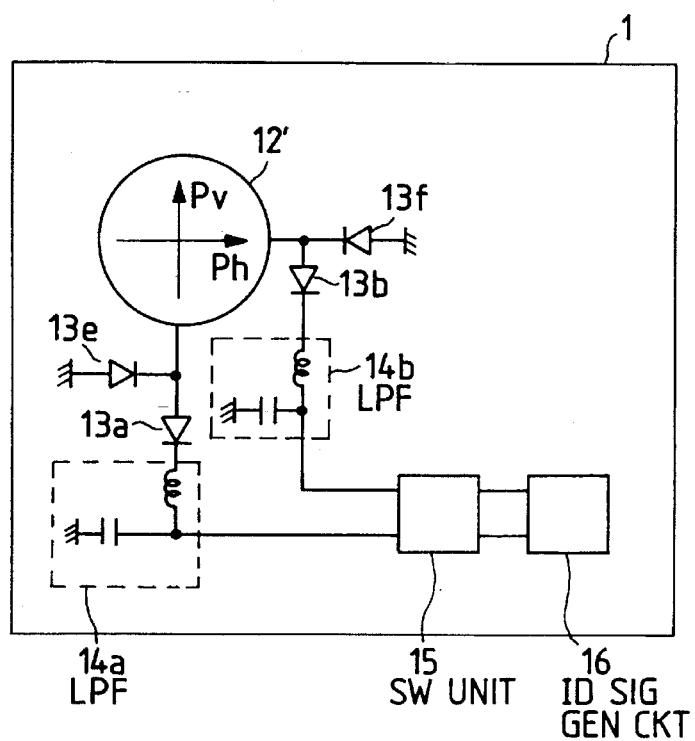
FIG. 13 is a plan view, partially schematic, of a twelfth embodiment for showing a responder including a microstrip line antenna of this invention.

FIG. 13 is a plan view, partially schematic, of a twelfth embodiment for showing a responder including a microstrip line antenna of this invention. This embodiment is a modification of the eighth embodiment shown in FIG. 9. That is, difference of this embodiment from the eighth embodiment is in that the microstrip line patch antenna 12' has a circular shape. Other structure and operation are the same as the eighth embodiment.

The microstrip antenna 12 used in the sixth embodiment can be replaced by the circular shape microstrip antenna 12' also.

Figure 14:
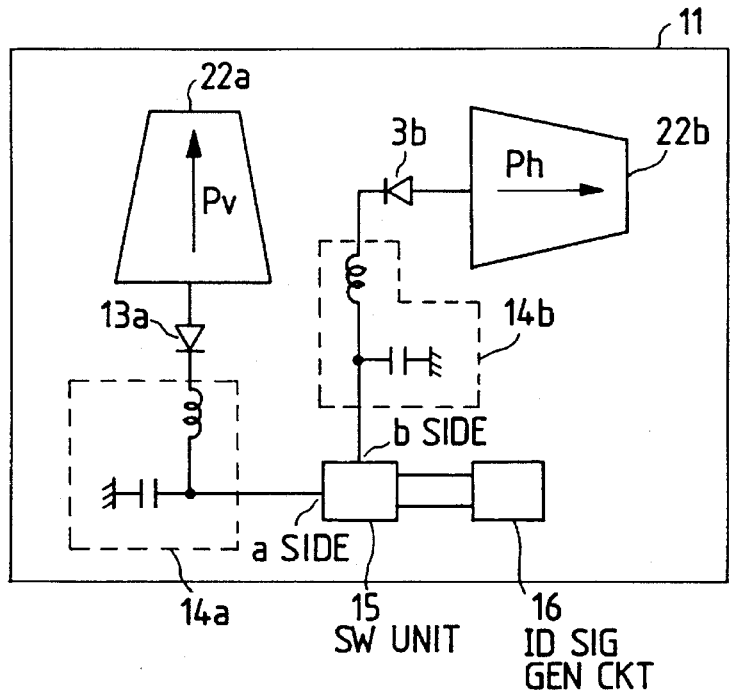
FIG. 14 is a plan view, partially schematic, of a thirteenth embodiment for showing a responder including a microstrip line antenna of this invention.

FIG. 14 is a plan view, partially schematic, of a thirteenth embodiment for showing a responder including a microstrip line antenna of this invention. This embodiment is a modification of the tenth embodiment shown in FIG. 11. That is, difference of this embodiment from the tenth embodiment is in that the microstrip line patch antenna 22a and 22b have trapezoid shapes. Other structure and operation are the same as the tenth embodiment.

Figure 15:
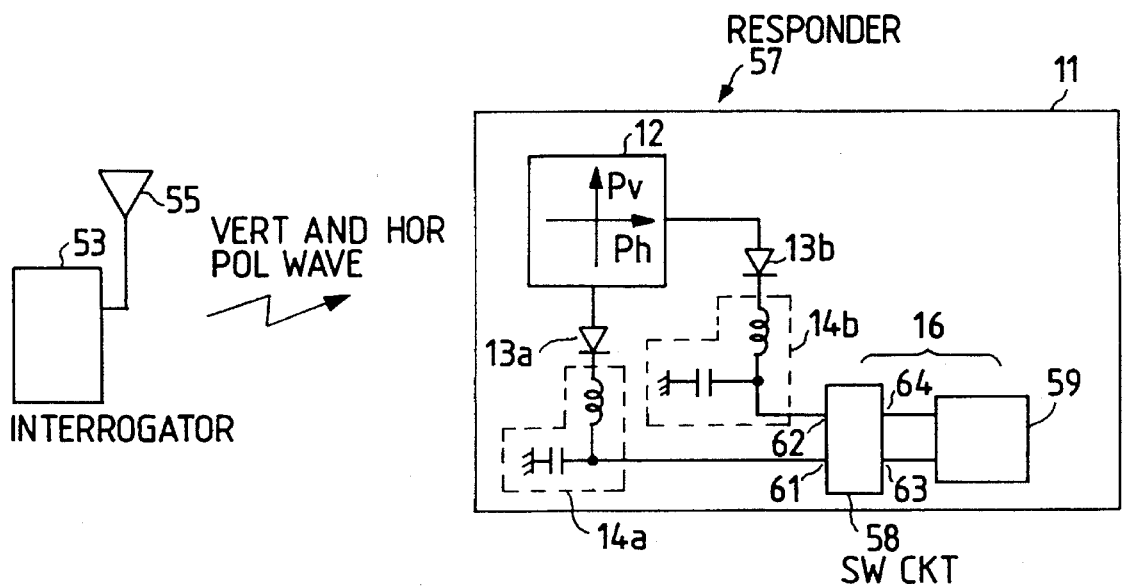
FIG. 15 is a plan view, partially schematic, of a fourteenth embodiment for showing an interrogator and a responder.

FIG. 15 is a plan view, partially schematic, of a fourteenth embodiment for showing an interrogator and a responder including a microstrip line antenna.

An interrogator 53 transmits an interrogation signal of microwave signals polarized in vertical and horizontal directions by an antenna 55. A responder 57 receives the interrogation signal and transmits an identification signal to the interrogator 53. The responder 57 comprises a microstrip line patch antenna (antenna) 12 for receiving the linearly polarized microwave signals transmitted from the interrogator 58, the antenna 12 having a square shape of which bases are about a half of the wavelength of the microwave signals to be received, a first diode 13a having an anode connected to the an intermediate portion of a side of the square shape of the antenna 12 and a cathode connected to a lowpass filter 14a for rectifying the received microwave signal from the interrogator, a second diode 13b having an anode connected to the an intermediate portion of a side of the square shape of the antenna 12 and a cathode connected to a lowpass filter 14b for rectifying the received microwave signal from the interrogator, a switch circuit 58, and an identification signal generation circuit 16 for generating an identification signal.

Figure 17:
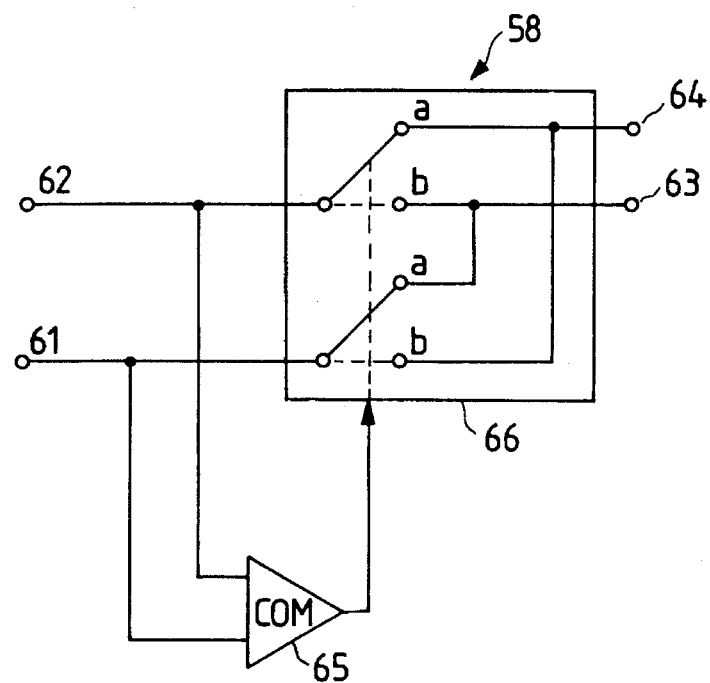
FIG. 17 is a schematic circuit diagram of a switch circuit 58 shown in FIGS. 15 and 16.

The microstrip line patch antenna 12 receives the interrogation signal in the vertical and horizontal directions (Pv, Ph) and supplies first and second dc powers through terminals 61 and 62 to the identification signal generation circuit 16 respectively. FIG. 17 is a schematic circuit diagram of a switch circuit 58 shown in FIG. 15. The switch circuit 58 comprises a comparator 65 for comparing intensities of the first and second dc supply powers and switches 66 for switching the connection condition between the lowpass filters 14a and 14b and the identification signal generation circuit 59 in accordance with the result of the comparator 65.

These switches 66 are switched between "a" side position and "b" side position. When these switches are in "a" side position, the terminal 61 is connected to the terminal 63 and the terminal 62 is connected to the terminal 64. When these switches are in "b" side position, the terminal 61 is connected to the terminal 64 and the terminal 62 is connected to the terminal 63. The terminal 63 is connected to a power input terminal of the identification signal generation circuit 59 for receiving a dc supply power. The terminal 64 is connected to an output of the identification signal generation circuit 59 for receiving the identification signal.

When the comparator 65 detects that the intensity of the first dc supply power is larger than the second dc supply power, the switches 66 supplies the first dc power to the identification signal generation circuit 59 and the identification signal from the identification signal generation circuit 59 to the lowpass filter 14b. On the other hand, when the comparator 65 detects that the intensity of the second dc supply power is larger than the first dc supply power, the switches 66 supplies the second dc power to the identification signal generation circuit 59 and the identification signal from the identification signal generation circuit 59 to the lowpass filter 14a.

In fact, the identification signal generation 16 used in the above-mentioned embodiments has the switching circuit 58 and the identification signal generation circuit 59. That is, the switching circuit 58 and the identification signal generation circuit 59 form the identification signal generator 16.

More specifically, in the identification signal generation circuit 16, one of first and second dc supply powers flows into the identification signal generation circuit 16. In other words, the other dc supply power does not flow into the identification signal generation circuit 16. On the other hand, the identification signal is supplied to the antenna 12 through one of the lowpass filters 14a and 14b which supplies the dc supply power having a smaller intensity.

Therefore, it is assumed that the first dc supply power supplied through the lowpass filter 14a has a larger intensity than the second dc supply power supplied through the lowpass filter 14b. The identification signal generation circuit 16 supplies the identification signal to the antenna 12 through the lowpass filter 14b, and the diode 13b. In this case the identification signal generation circuit 16 transmits the identification signal such that the reflectivity at the antenna 12 is varied with the identification signal.

Figure 16:
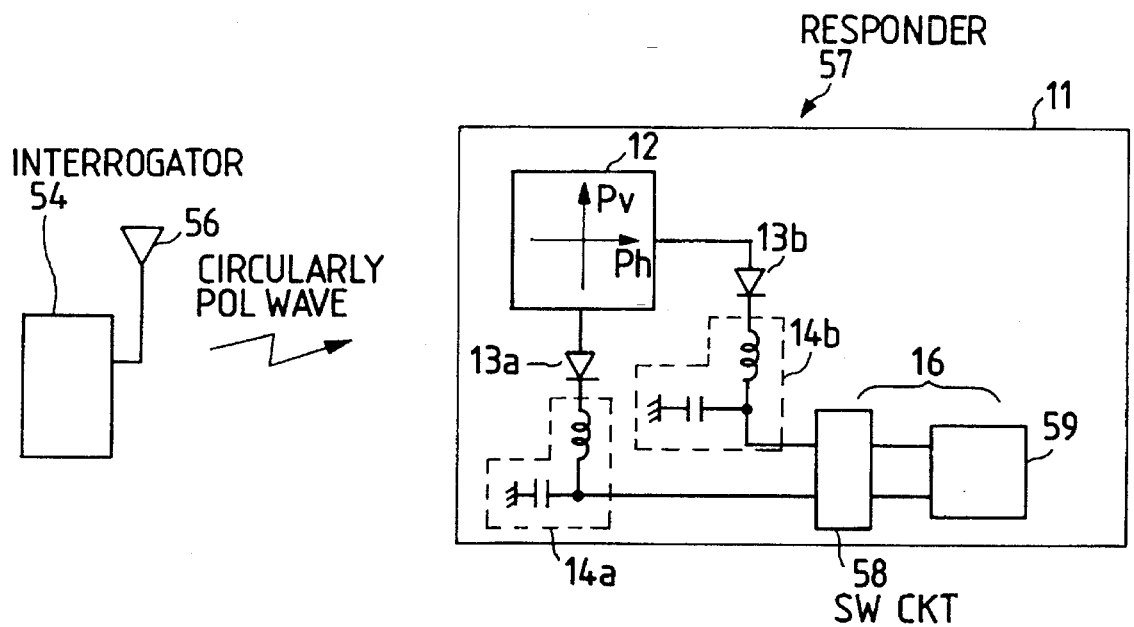
FIG. 16 is a plan view, partially schematic, of a fifteenth embodiment for showing an interrogator and a responder including a microstrip line antenna.

FIG. 16 is a plan view, partially schematic, of a fifteenth embodiment for showing an interrogator and a responder including a microstrip line antenna.

An interrogator 54 transmits an interrogation signal of microwave signal circularly polarized by an antenna 56. A responder 57 receives the interrogation signal both direction Pv and Ph and transmits an identification signal to the interrogator 54. The responder 57 has the same structure as the fourteenth embodiment. The microstrip line patch antenna 12 receives vertically and horizontally polarized components (Pv, Ph) from the circularly polarized interrogation signal and supplies first and second dc powers through lowpass filters 14a and 14b to the identification signal generation circuit 16 respectively. More specifically, the microstrip line patch antenna 12 receives vertical and horizontal component from the circularly polarized interrogation signal. The antenna 12 generates first and second dc supply powers. However, one of first and second dc powers which has a larger intensity than the other is supplied to the identification signal generation circuit 16. That is, the other of first and second dc powers does not enter the identification signal generation circuit 16. More specifically, it is assumed that the first dc supply power supplied through the lowpass filter 14a has a larger intensity than the second supply power supplied through the lowpass filter 14b. The identification signal generation circuit 16 supplies the identification signal to the antenna 12 through the lowpass filter 14b, and the diode 13b. In this case the identification signal generation circuit 16 transmits the identification signal such that the reflectivity at the antenna 12 is varied with the identification signal.

What is claimed is:

1. An electric power receiving circuit for receiving electric power of a radio signal comprising:

(a) an antenna for receiving said electric power, said antenna having a microstrip line formed in a quadrangle shape having first and second sides confronting each other, said first side having a first length corresponding to a half of a wavelength of said radio signal, said second side having a second length larger than a quarter of said wavelength of said radio signal and smaller than a half of said wavelength; and (b) power supplying means for supplying a dc power from said received electric power.

2. An electric power receiving circuit as claimed in claim 1, wherein said power supplying means comprises a diode having first and second terminals, one terminal being connected to said antenna around an intermediate portion of said first side, for rectifying said received electric power to supply said dc power.

3. An electric power receiving circuit as claimed in claim 1, further comprising a lowpass filter for smoothing said dc power.

4. An electric power receiving circuit as claimed in claim 1, wherein said power supplying means comprises first and second diodes, said first diode having a first anode connected to said antenna around an intermediate portion of said second side and a first cathode, said second diode having a second cathode connected to said antenna around said intermediate portion and second anode, said dc power being provided between said said first cathode and said second anode.

5. An electric power receiving circuit as claimed in claim 4, further comprising a first lowpass filter connected to said first cathode and a second lowpass filter connected to said second anode, said first and second lowpass filter smoothing said dc power.

6. An electric power receiving circuit as claimed in claim 1, wherein said microstrip line formed in a trapezoid having a height smaller than said half of said wavelength and larger than said quarter of said wavelength.

7. An electric power receiving circuit as claimed in claim 6, wherein a length of said second side is from five to seven sixteenths of said wavelength.

8. An electric power receiving circuit as claimed in claim 7, wherein said length of said second side is from three eights of said wavelength.

9. An electric power receiving circuit as claimed in claim 6, wherein said height is from 85% to 95% of said wavelength.

10. An electric power receiving circuit as claimed in claim 6, wherein said height is 90% of said wavelength.

11. An electric power receiving circuit for receiving electric power of a radio signal comprising:
   (a) first and second antennas for receiving said electric power, each of said first and second antennas having a microstrip line formed in a quadrangle shape having first and second sides confronting each other, said first side having a first length corresponding to a half of a wavelength of said radio signal, said second side having a second length being larger than a quarter of said wavelength and smaller than a half of said wavelength, said first and second antennas being arranged in a line such that said first sides of said first and second antennas confront each other and have a predetermined interval between said second sides of said first and second antennas; and
   (b) power supplying means for supplying a dc power from said received electric power.

12. An electric power receiving circuit as claimed in claim 11, wherein said predetermined interval corresponds to said wavelength.

13. An electric power receiving circuit as claimed in claim 1, wherein said power supplying means comprises a diode, having an anode and a cathode, said anode being connected to said first antenna around an intermediate portion of said first side of said first antenna, said cathode being connected to said second antenna around an intermediate portion of said first side of said second antenna, for rectifying said received electric power to provide said dc power between said anode and cathode.

14. An electric power receiving circuit as claimed in claim 11, further comprising a first lowpass filter connected to said anode and a second lowpass filter connected to said cathode, said first and second lowpass filter smoothing said dc power.

15. An electric power receiving circuit as claimed in claim 11, wherein said power supplying means comprises a bridge rectifying circuit, having first and second input terminals connected to said first and second antennas around intermediate portions of said first sides of said first and second antennas respectively and first and second output terminals, for rectifying said received electric power to provide said dc power between said first and second output terminals.

16. An electric power receiving circuit as claimed in claim 15, wherein said predetermined interval corresponding to one wavelength of said radio signal.

17. An electric power receiving circuit as claimed in claim 15, further comprising a first lowpass filter connected to said first output terminal and a second lowpass filter connected to said second output terminal, a smoothed dc power being supplied between said first and second lowpass filters.

18. An electric power receiving circuit as claimed in claim 11, wherein said microstrip line formed in a trapezoid having a height smaller than said half of said wavelength and larger than said quarter of said wavelength.

19. An electric power receiving circuit as claimed in claim 11, wherein a length of said second side of each of said first and second antennas is from five to seven sixteenths of said wavelength.

20. An electric power receiving circuit as claimed in claim 19, wherein said length of said second side is from three eights of said wavelength.

21. An electric power receiving circuit as claimed in claim 11, wherein said height is from 85% to 95% of said wavelength.

22. An electric power receiving circuit as claimed in claim 6, wherein said height is approximately 90% of said wavelength.

23. An electric power receiving circuit for receiving an electric power of a radio signal comprising:
   (a) an antenna for receiving said electric power, said antenna having a microstrip line including first and second part, said first part being formed in a quadrangle shape having first and second sides confronting each other, said first side having a first length corresponding to a half of a wavelength of said radio signal, said second side having a second length being larger than a quarter of said wavelength of said radio signal and smaller than a half of said wavelength, said second part defined by an arch and a chord of said arc, said chord being defined by said first side; and
   (b) power supplying means for supplying a dc power from said received electric power.

24. An electric power receiving circuit as claimed in claim 23, wherein said power supplying means comprises a diode having first and second terminals, said first terminal being connected to said antenna around an intermediate portion of said arch and a cathode for rectifying said received electric power to supply said dc power.

25. An electric power receiving circuit as claimed in claim 23, further comprising a lowpass filter for smoothing said dc power.

26. A responder for transmitting an identification signal in response to a radio signal transmitted from an interrogator comprising: an electric power receiving circuit, for receiving an electric power of said radio signal to produce a dc supply power for transmitting said identification signal, having:
   (a) an antenna for receiving said electric power, said antenna having a microstrip line formed in a quadrangle shape having first and second sides confronting each other, said first side having a first length corresponding to a half of a wavelength of said radio signal, said second side having a second length being larger than a quarter of said wavelength of said radio signal and smaller than a half of said wavelength; and
   (b) power supplying means for supplying a dc power from said received electric power.

27. A responder for transmitting an identification signal in response to a radio signal transmitted from an interrogator comprising: an electric power receiving circuit, for receiving an electric power of said radio signal to produced a dc supply power for transmitting said identification signal, having:
   (a) first and second antennas for receiving said electric power, each of said first and second antennas having a microstrip line formed in a quadrangle shape having first and second sides confronting each other, said first side having a first length corresponding to a half of a wavelength of said radio signal, said second side having a second length being larger than a quarter of said wavelength and smaller than a half of said wavelength, said first and second antennas being arranged in a line such that said first sides of said first and second antennas confront each other with a given space; and (b) power supplying means for supplying a dc power from said received electric power.

28. A responder for transmitting an identification signal in response to a radio signal transmitted from an interrogator comprising: an electric power receiving circuit, for receiving an electric power of said radio signal to produced a dc supply power for transmitting said identification signal, having:

(a) an antenna for receiving said electric power, said antenna having a microstrip line including first and second part, said first part being formed in a quadrangle shape having first and second sides confronting each other, said first side having a first length corresponding to a half of a wavelength of said radio signal, said second side having a second length being larger than a quarter of said wavelength of said radio signal and smaller than a half of said wavelength, said second part defined by an arch and a chord of said arc, said chord being defined by said first side and;

(b) power supplying means for supplying a dc power from said received electric power.

29. A responder for transmitting an identification signal in response to a radio signal polarized in a predetermined direction transmitted from an interrogator comprising:

(a) an antenna for receiving said electric power of said radio signal, said antenna having a microstrip line extending in first and second directions perpendicular each other, said antenna having first and second peripheral portions in said first and second directions respectively and first and second feeding points at said first and second peripheral portions to supply first and second dc supply powers generated in response to said received electric power respectively;

(b) altitude detection means for detecting an altitude of said antenna to determine which first and second directions agrees with said predetermined direction;

(c) power supplying means for supplying, in accordance with said detected altitude, said first dc supply power from said first feeding point when said predetermined direction is parallel to said first direction and a second dc supply power from said second feeding point when said predetermined direction is parallel to said second direction; and (d) identification signal generation and transmitting means responsive to said first and second dc supply powers for generating and supplying said identification signal through said second feeding point when said predetermined direction is parallel to said first direction and through said first feeding point when said predetermined direction is parallel to said second direction, said antenna transmitting said identification signal in response to said supplied identification signal.

30. A responder as claimed in claim 29, wherein said microstrip line having a quadrangle shape.

31. A responder as claimed in claim 29, wherein said microstrip line having a circle shape.

32. A responder for transmitting an identification signal in response to a radio signal polarized in a predetermined direction transmitted from an interrogator comprising:

(a) an antenna for receiving said electric power of said radio signal, said antenna having a microstrip line formed in a quadrangle shape having a first pair of sides confronting each other and a second pair of sides confronting each other;

(b) altitude detection means for detecting an altitude of said antenna to determine which pair of said first and second pair of sides is substantially perpendicular to said predetermined direction;

(c) power supplying means for supplying, in accordance with said detected altitude, a dc supply power from said antenna around one of said first and second pair of said sides which is substantially perpendicular to said direction at the present condition of said altitude; and (d) identification signal generation and transmitting means responsive to said dc supply power for generating and supplying said identification signal to said antenna around the other of said first and second pair of said side, said antenna transmitting said identification signal toward said interrogator.

33. A responder as claimed in claim 32, wherein said power supplying means comprises a first diode having a first pair of terminals and a second diode having a second pair of terminals, one of said first pair of terminals being connected to said antenna around an intermediate portion of said first side, one of said second pair of terminals being connected to said antenna around an intermediate portion of said third side.

34. A responder as claimed in claim 33, wherein said power supplying means further comprises a third diode having a third pair of terminals and a fourth diode having a fourth pair of terminals to provide a double voltage rectification of said dc voltage, one of said first pair of terminals being connected to said antenna around an intermediate of said first side, one of said fourth pair of terminals being connected to said antenna around said intermediate portion of said third side, the other of said first and second pair of terminals being grounded, said first and second diodes having the same rectifying directions opposite to said third and fourth diodes with respect to said antenna.

35. A responder as claimed in claim 33, wherein said first and second diodes have a first voltage-current characteristic and said third and fourth diodes have a second voltage-current characteristic different from said first voltage-current characteristic.

36. A responder for transmitting an identification signal in response to a radio signal polarized in a predetermined direction transmitted from an interrogator comprising:

(a) an antenna for receiving electric power of said radio signal, said antenna having a microstrip line formed in a quadrangle shape having first and second sides confronting each other and third and fourth sides confronting each other;

(b) power supplying means for supplying a dc supply power from said antenna around said first and third side;

(c) identification signal generation means responsive to said dc supply power for generating said identification signal; and (d) coupling means for supplying said identification signal to said antenna around said second and fourth sides, said antenna transmitting said identification signal toward said interrogator.

37. A responder as claimed in claim 36, wherein said power supplying means comprises first and second diodes of which one ends are connected to said antenna around said first and third sides respectively.

38. A responder for transmitting an identification signal in response to a radio signal polarized in a predetermined direction transmitted from an interrogator comprising:

(a) first and second antennas arranged in a line, each receiving electric power of said radio signal, said antenna having a microstrip line formed in a quadrangle shape;

(b) altitude detection means for detecting altitude of said first and second antennas;

(c) first power supplying means for supplying a first dc supply power from said received electric power developed at said first antenna in accordance with said detected altitude when said line is perpendicular to said predetermined direction;

(d) second power supplying means for supplying a second dc supply power from said received electric power developed at said second antenna in accordance with said detected altitude when said line is parallel to said predetermined direction; and (e) identification signal generation and transmitting means for generating and supplying said identification signal to said second antenna which transmits said identification signal polarized in a direction parallel to said line when said line is perpendicular to said predetermined direction in response to said first dc supply power and to said first antenna which transmits said identification signal polarized in perpendicular to said line when said line is parallel to said line in response to said first dc supply power.

39. A responder as claimed in claim 38, wherein said microstrip line has a trapezoid shape.

40. A responder for transmitting an identification signal in response to a radio signal polarized in a predetermined direction transmitted from an interrogator comprising:

(a) an antenna for receiving said electric power of said radio signal, said antenna having a microstrip line formed in a circle having first and second feeding points at peripheral portions of said circle, a first radius defined by said first feeding point and a second radius defined by said second feeding points being perpendicular;

(b) altitude detection means for detecting an altitude of said antenna;

(c) power supplying means for supplying, in accordance with said detected altitude, a dc supply power from said first feeding point when said predetermined direction is parallel to said first radius and from said second feeding point when said predetermined direction is parallel to said second radius; and (d) identification signal generation and transmitting means responsive to said dc supply power for generating and supplying said identification signal to said antenna through said second feeding point of when said predetermined direction is parallel to said first radius and through said first feeding point when said predetermined direction is parallel to said second radius.

41. A responder as claimed in claim 40, wherein said power supplying means further comprises a third diode having a third pair of terminals and a fourth diode having a fourth pair of terminals to provide a double voltage rectification of said dc voltage, one of said first pair of terminals being connected to said antenna around an intermediate of said first side, one of said fourth pair of terminals being connected to said antenna around said intermediate portion of said third side, the other of said first and second pair of terminals being grounded, said first and second diodes having the same rectifying directions opposite to said third and fourth diodes with respect to said antenna.

42. A responder for transmitting an identification signal in response to a radio signal polarized in a predetermined direction transmitted from an interrogator comprising:

(a) an antenna for receiving electric power of said radio signal, said antenna having a microstrip line formed in a circle having first to fourth feeding points at peripheral portions of said circle, a first diameter defined by said first and third feeding points and a second diameter defined by said second and fourth feeding points being perpendicular;

(b) power supplying means for supplying a dc supply power from said first feeding point when said predetermined direction is parallel to said first diameter and from said second feeding point when said predetermined direction is parallel to said second diameter;

(c) identification signal generation means responsive to said dc supply power for generating said identification signal; and (d) coupling means for supplying said identification signal to said antenna through said third and fourth feeding points, said antenna transmitting said identification signal toward said interrogator.

43. A responder for transmitting an identification signal in response to an interrogation signal transmitted from an interrogator with vertical and horizontal polarization, comprising:

(a) an antenna for receiving said electric power of said radio signal, said antenna having a microstrip line extending in first and second directions perpendicular each other to generate first and second dc supply powers in response to said received electric power, said antenna having first and second peripheral portions in said first and second directions respectively and first and second feeding points at said first and second peripheral portions to supply said first and second dc supply power respectively;

(b) comparing means for comparing said first with second dc supply power in intensity;

(c) power supplying means for supplying either of said first or second dc supply powers from said first or second feeding points in accordance with an output of the comparing means; and (d) identification signal generation and transmitting means responsive to said first and second dc supply powers for generating and supplying said identification signal through said second feeding point when an intensity of said first dc supply power is larger than an intensity of said second dc supply power and through said first feeding point when said intensity of said first dc supply power is not larger than said intensity of said second dc supply power.

44. A responder for transmitting an identification signal in response to an interrogation signal transmitted from an interrogator with circular polarization, comprising:

(a) an antenna for receiving said electric power of said radio signal, said antenna having a microstrip line extending in first and second directions perpendicular each other to generate first and second dc supply powers along said first and second directions in response to said received electric power, said antenna having first and second peripheral portions in said first and second directions respectively and first and second feeding points at said first and second peripheral portions to supply said first and second dc supply power respectively;

(b) comparing means for comparing said first with second dc supply power in intensity;
(c) power supplying means for supplying either of said first or second dc supply powers from said first or second feeding points in accordance with the result of the comparing means; and
(d) identification signal generation and transmitting means responsive to said first and second dc supply powers for generating and supplying said identification signal through said second feeding point when an intensity of said first dc supply power is larger than an intensity of said second dc supply power and through said first feeding point when said intensity of said first dc supply power is not larger than said intensity of said second dc supply power.

* * * * *

UNITED STATES PATENT AND TRADEMARK OFFICE
CERTIFICATE OF CORRECTION

PATENT NO. : 5,530,637
DATED : June 25, 1996
INVENTOR(S) : Suguru Fujita et al.

It is certified that error appears in the above-indentified patent and that said Letters Patent is hereby corrected as shown below:

column 7, line 16, replace " i " with --1--; and column 15, lines 5&6, replace " interrogator58 " with --interrogator 53--.

column 9, line 49, replace "3b" with --13b--;

column 11, line 42, replace "exist" with --exists--;

column 11, line 65, replace "14b" with --14--;

column 13, line 37, replace "exist" with --exists--; and in Fig. 14, change reference numeral "3b" to --13b--.

Signed and Sealed this

Seventeenth Day of June, 1997

Attest:

BRUCE LEHMAN

Attesting Officer

Commissioner of Patents and Trademarks